(12) United States Patent
Olson (10) Patent No.: US 6,185,825 B1
(45) Date of Patent: Feb. 13, 2001

(54) CABLE AND WIRE CUTTERS

(75) Inventor: Douglas D. Olson, Vero Beach, FL (US)

(73) Assignee: Knight's Armament Company, Vero Beach, FL (US)

( * ) Notice: Under 35 U.S.C. 154(b), the term of this patent shall be extended for 0 days.

(21) Appl. No.: 09/370,156

(22) Filed: Aug. 9, 1999

(51) Int. Cl.[7] .............................. B26B 13/06; B26B 13/22
(52) U.S. Cl. ........................ 30/250; 30/90.1; 30/92; 30/249; 30/251; 30/252
(58) Field of Search ................................ 30/92, 90.1, 249, 30/250, 252, 251, 194

(56) References Cited

U.S. PATENT DOCUMENTS

| | | | |
|---|---|---|---|
| 474,696 | * 5/1892 | Samsel | 30/250 |
| 2,502,582 | * 4/1950 | Murphy et al. | 30/194 |
| 4,459,717 | * 7/1984 | Halstead | 30/250 |
| 5,261,263 | * 11/1993 | Whitesell | 30/90.1 |

* cited by examiner

Primary Examiner—Hwei-Siu Payer
(74) Attorney, Agent, or Firm—Carroll F. Palmer (57) ABSTRACT

Cable and wire cutters of new design have an outside cutter member containing an arcuate cavity within which an inside cylinderical cutter member rotates about a common pivot axis so separate cutting slots in the outside and inside cutter members cross during the cutting operation within the circumference of the inside cutter thereby remarkably improving the mechanical advantage in these new cutters as compared to the prior art because cutting of the work piece occurs closer to the common pivot axis of the cutting slots than has been possible with prior known cable and wire cutters. A variety of specific embodiments of the new cutter design are disclosed.

13 Claims, 10 Drawing Sheets

CABLE AND WIRE CUTTERS

BACKGROUND OF THE INVENTION

1. Field of the Invention

This invention relates to new, improved cable and wire cutters. More particularly, it concerns cable and wire cutters of unique design that permit the cutting to be performed more easily and quietly than with prior known types of such cutters.

2. Description of the Prior Art

The construction of prior art cable and wire cutters has depended upon the positioning of two cutting members adjacent a solid pin upon which such members pivot. The diameter of the pivot pin must be sufficiently large to carry the load caused by the shearing action of the cutting members. The result is that the work piece being cut is located a significant distance from the pivot point and this, in turn, requires long handles or force multipliers to develop the force in the cutting members necessary to cut the work piece. Thus, the mechanical advantage of a simple cutter is the distance from the pivot point to the point of applied force, roughly the handle length, divided by the length from the center of the work piece to the center of the pivot, e.g., see U.S. Pat. No. 5,826,338. As the distance from the center of the work piece to the center of the pivot point increases, both the force required to make the cut and the load on the pivot increase.

In order to reduce the length of handles required to develop the force necessary to cut cables and wires, so-called compound cutters comprising force multipliers, e.g., gear or cam systems have been developed as shown in U.S. Pat. Nos. 4,378,636, 4,677,748, 5,184,404 & 5,689,888.

The present invention has provided an improvement in the art of construction of cable and wire cutters by the discovery of a new design that locates the cutting surfaces extremely close to their pivot point.

OBJECTS

A principal object of the invention is the provision of cable and wire cutters that are substantially different from previous styles of such cutters that have been built in the past.

Further objects include the provision of cable and wire cutters that:

(1) Have the ability to get their cutter notches closer to the pivot point of the two opposing cutter blades then has been possible with related cutters of the prior art.

(2) Locate the opposing cutting surfaces within the pivot joint of the cutters.

(3) Are capable of cutting wire or cable without creating any appreciable snipping sound or like noise so that use of the new cutters does not compromise night security.

(4) Operate in cutting cable to bring the cutting surfaces against the cable in a manner that does not squash the cut ends of the cable.

(5) Have one of the cutting members of the cutter serve as the pivot element thereof.

(6) Have the pivot element thereof with a diameter greater than the cable or wire to be cut by the cutter.

(7) Are of a design that allows them to be combined with a knife or other tool readily to make combination tools.

(8) Are capable of being combined with gears, cams or like power multiplying mechanisms.

(9) Can be structured in a "pull-to-cut" configuration to provide maximium cutting force to the work piece at the start of the cut.

(10) Function when used to cut cable or wire with a shearing action as opposed to a crushing action.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of cable and wire cutters of new design comprising an outside cutter member containing an arcuate cavity within which an inside cylinderical cutter member rotates about a common pivot axis so separate cutting slots in the outside and inside cutter members cross during the cutting operation within the circumference of the inside cutter. Such construction remarkably improves the mechanical advantage in the new cutter as compared to the prior art because cutting of the work piece occurs closer to the common pivot axis of the cutting slots than has been possible with prior known cable and wire cutters.

The new cable and wire cutters of the invention basically comprise a first cutter member, a second cutter member and force means to rotate the first cutter member relative to the second cutter member about a common pivot axis to cut a work piece.

The first cutter member contains an arcuate cavity defined by a first periphery that is at least partially circular having a first radius "A". One end of the radius "A" is at the common pivot axis.

There is a first slot, sized to receive the work piece, in the first cutter member that extends through the first periphery into the arcuate cavity radially toward the pivot axis.

The second cutter member comprises a cylinderical part defined by a circular second periphery having a second radius "B" nearly equal to radius "A" with one end of the radius "B" being positioned at the common pivot axis.

There is a second slot, sized to receive the work piece, in the cylindercial part that extends through the second periphery radially toward the common pivot axis.

Retaining means holds the cylinderical part in the arcuate cavity for rotation about the pivot axis via the force means to pass the first slot across the second slot to cut the work piece.

To rephrase the above in a broad sense, the new cable and wire cutters of the invention comprise a first cutter member and a second cutter member. The second cutter member has a circular periphery defined by a given radius and a given inside end, which circular periphery is greater than the periphery of cable or wire to be cut by said cutter. Also, the first cutter member has a partially circular cavity defined by another radius slightly longer than the given radius and another inside end. Further, the given inside end is coincident with said another inside end whereby the partially circular cavity of the first cutting member serves as the pivot element for the second cutter member. As a result, the pivot element is extremely robust and is located very close to the position at which cutting of the cable or wire occurs whereby a smaller force needs to be applied to the cutter members in order for them to cut the workpiece than has been required in prior know cutters capable of handling a given size of cable or wire.

In a first embodiment of the new cutters, the force means comprises a first handle extending from the first cutter member plus a second handle extending from the second cutter member and the first handle is moved toward the second handle to rotate the first slot across the second slot to cut the work piece. Preferrably, the first handle is essentially straight and defined by a first inner end attached to the first cutter member, a first outer end and an elongated midsection integrally joining the first inner end to the first outer end while the second handle is essentially straight and defined by a second inner end attached to the second cutter member, a second outer end and an elongated midsection integrally joining the second inner end to the second outer end.

In a second embodiment of the new cutters with a "pull-to-cut" configuration, the force means comprises a first handle extending from the first cutter member plus a second handle extending from the second cutter member and the first handle is moved away from the second handle to rotate the first slot across the second slot to cut the work piece. Preferably, the first handle is U-shaped defined by an first arcuate inner end attached to the first cutter member, an first arcuate outer end and an elongated midsection integrally joining the first acurate inner end to the first arcuate outer end while the second handle is U-shaped and defined by a second arcuate inner end attached to the second cutter member, a second arcuate outer end and an elongated midsection integrally joining the second arcuate inner end to the second arcuate outer end.

In a third embodiment of the new cutters, the force means comprises a extension arm fixed at its inner end to the first cutter member with a lever arm pivoted at its inner arm to the outer end of the extension arm. The force means further comprises a crank arm pivoted (a) at its inside end to the second cutter member, (b) pivoted at its outside end to the lever arm between the inner and outer ends of the lever arm and (c) pivoted along its central portion at an adjustable position along the central portion of the extension arm. The central adjustable positioning of the crank arm relative to the extension arm enables the force applied to the second cutter member in movement relative to the first cutter member by the crank arm to be varied.

In a fourth embodiment of the new cutters, the force means comprises a knife blade fixed at its inner end to the first cutter member and lever arm fixed at its inner arm to the second cutter member. A handle for the knife blade is slidable along the lever arm between (1) a closed position where its inner end encloses the first and second cutter members and operatively engages the knife blade and (2) an opened position where it functions as an extension of the lever arm for movement of the second cutter member relative to the first cutter member for the cutting of cables or wires. This embodiment of the new cutters serves as a multifunctional military combat weapon, i.e., as a combination combat knife and wire cutter.

BRIEF DESCRIPTION OF THE DRAWINGS

A more complete understanding of the invention can be obtained by reference to the accompanying drawings in which generic parts of the illustrated matter are indicated by arrowhead lines associated with the designation numerals while specific parts are indicated with plain lines associated with the numerals and wherein.

DESCRIPTION OF THE PREFERRED EMBODIMENTS

Figure 1:
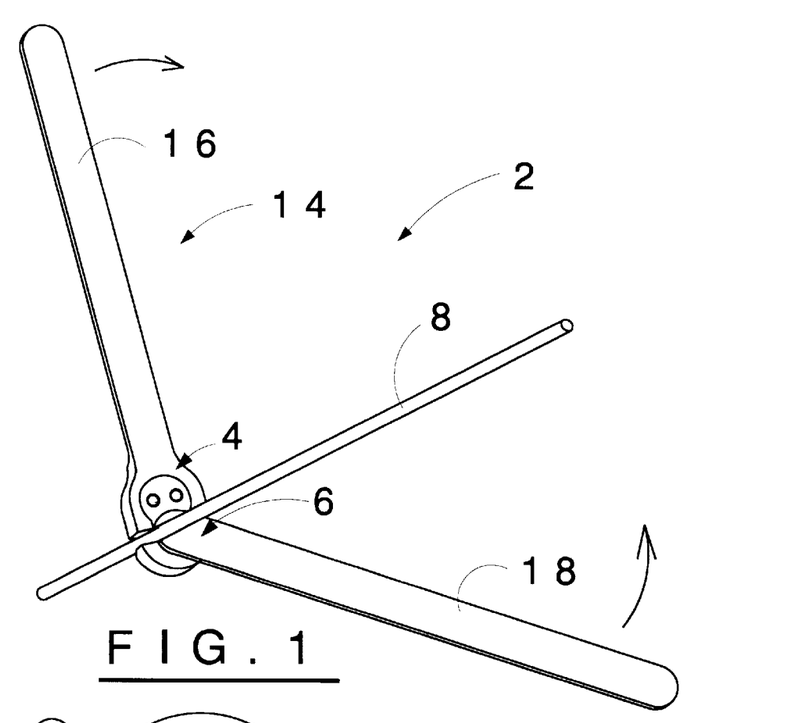
FIG. 1 is an isometric view of a cable and wire cutter of the invention shown cutting a section of wire.

Referring in detail to the drawings starting with FIG. 1, a first embodiment of a cable and wire cutter 2 of the invention, comprising a first cutter member 4 and a second cutter member 6, is shown cutting a wire 8.

Figure 2:
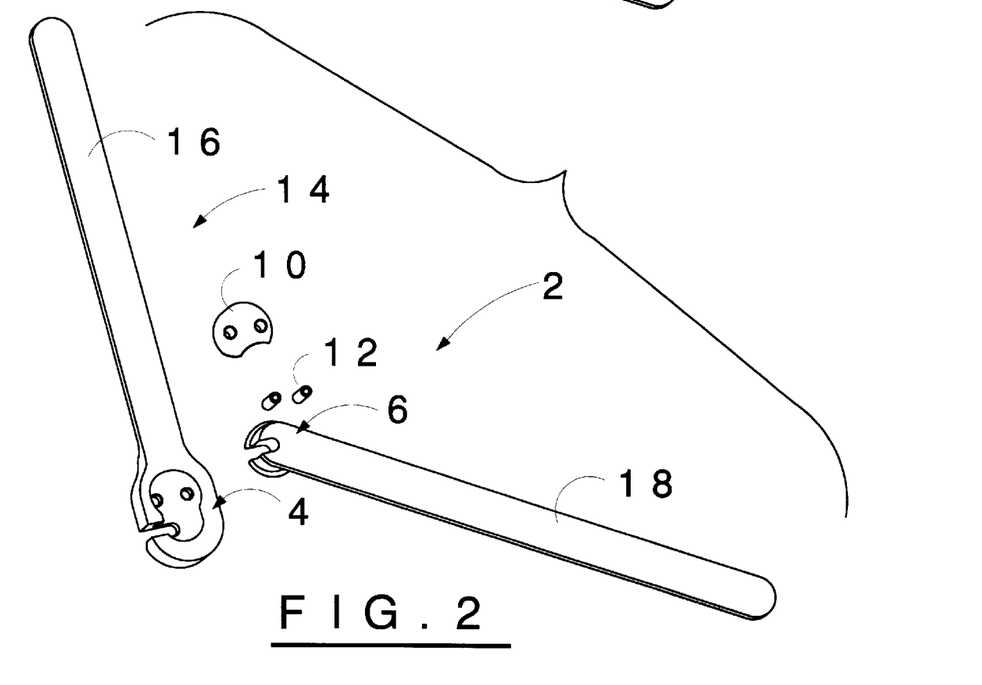
FIG. 2 is an exploded view of the cutter shown in FIG. 1.

FIG. 2 shows the cutter 2 further comprises retainer means 10 and pins 12 to hold cutter member 6 rotatably positioned in cutter member 4. It also shows that force means 14, which serves to rotate the cutter member 4 relative to the cutter member 6, is a first handle 16 that extends integrally from the cutter member 4 and a second handle 18 that extends integrally from the cutter member 6. When the handles 16 and 18 are moved toward each other as shown by the arrows in FIG. 1, the cutter members 4 & 6 rotate relative to each other about a pivot axis, which is close to the longitudinal axis of wire 8, to thereby cut the wire 8.

Referring to FIGS. 3–9, the first cutter member 4 comprises a planar web 20 defined by a web inside surface 22, a web outside surface 24 and a perimeter wall 26 having an outer wall surface 28 and an inner wall surface 30 upstanding from the web inside surface 22.

The inner wall surface 30 and the web inside surface 22 define an oval chamber 32 having a semicylinderical end portion 34 of first radius and an opposed arcuate end portion 36. Also, a semicircular ledge 38 extends laterally from the inner wall surface 30, defining with the inner wall surface 30 and the web inside surface 22, a semicylinderical cavity 40 in the semicylinderical end portion 34, one end of such first radius being located at the pivot axis 42.

Figure 3:
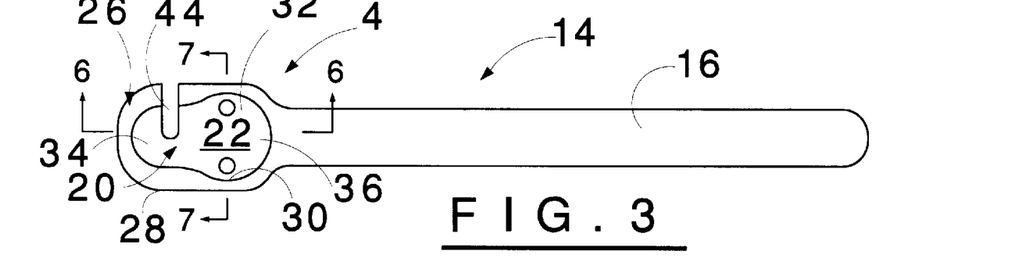
FIG. 3 is plan view of a portion of a first embodiment of the cable and wire cutters of the invention
Figure 4:
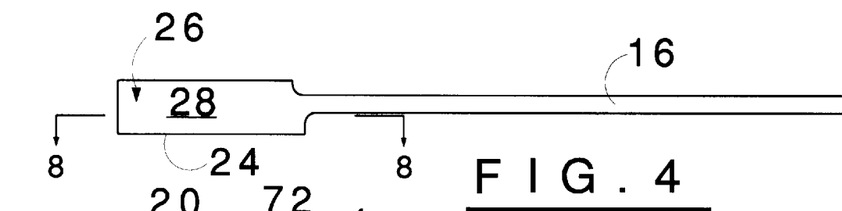
FIG. 4 is a lateral view of the portion shown in FIG. 3.
Figure 5:
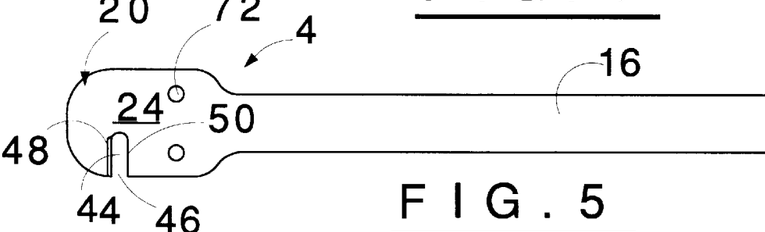
FIG. 5 is a bottom view of the portion shown in FIG. 3.
Figure 6:
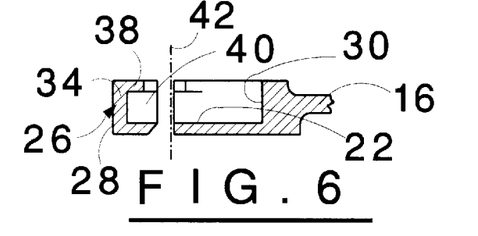
FIG. 6 is a sectional view taken on the line 6—6 of FIG. 3.
Figure 7:
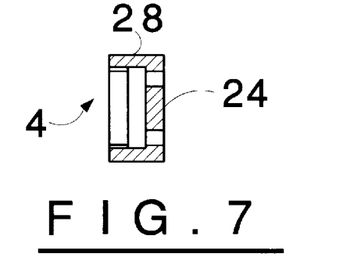
FIG. 7 is a sectional view taken on the line 7—7 of FIG. 3.
Figure 8:
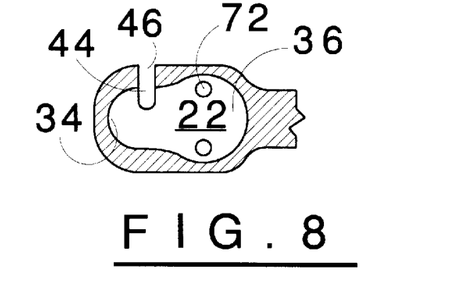
FIG. 8 is a sectional view taken on the line 8—8 of FIG. 4.
Figure 9:
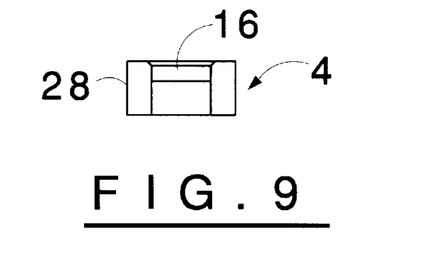
FIG. 9 is an end view taken for the right side of FIG. 4.
Figure 10:
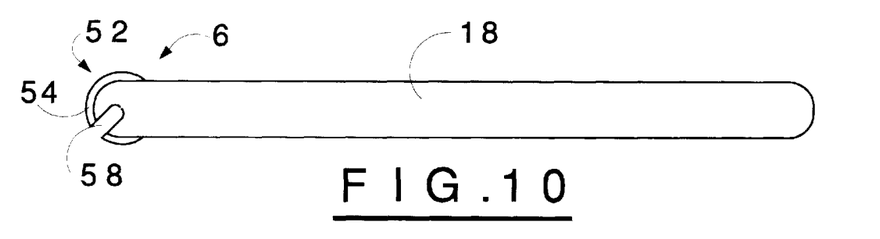
FIG. 10 is plan view of another portion of the first embodiment of the cable and wire cutters of the invention.
Figure 11:
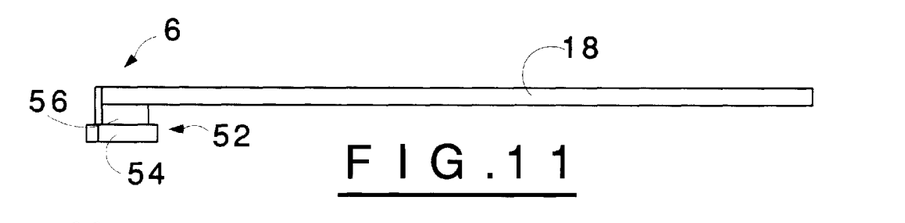
FIG. 11 is a lateral view of the portion shown in FIG. 10.

A slot 44 extends through both the perimeter wall 26 and the planar web 20 providing an entrance 46 into the oval chamber 32 for the work piece 8 (see FIG. 1) and defining in the planar web 20 a cutting edge 48 and an opposed edge 50 that both extend parallel from the perimeter wall 26 toward the pivot axis 42.

Referring to FIGS. 10–13, the second cutter member 6 comprises a tiered cylinder 52 defined by a base tier 54 having a second radius slightly shorter than the first radius and an integral upper tier 56 of third radius shorter than the second radius, one end of each second radius and third radius being located at the pivot axis 42.

A second slot 58 extends through both the base tier 54 and the upper tier 56 providing an entrance 60, extending toward the pivot axis into the tiered cylinder 52, for the work piece 8.

The base tier 54 of the second cutter member 6 is rotatably positioned (see FIG. 1) in the semicylinderical cavity 40 of the first cutter member 4 permitting the force means 14 to rotate the first slot 44 across the second slot 58 to cut the work piece 8.

With reference to FIGS. 14–18, the arcuate end portion 36 of oval chamber 32 includes retainer means 10 and pins 12 to retain base tier 54 of second cutter member 6 within semicylinderical cavity 40 of first cutter member 4.

Figures 12, 13, 14, 17:
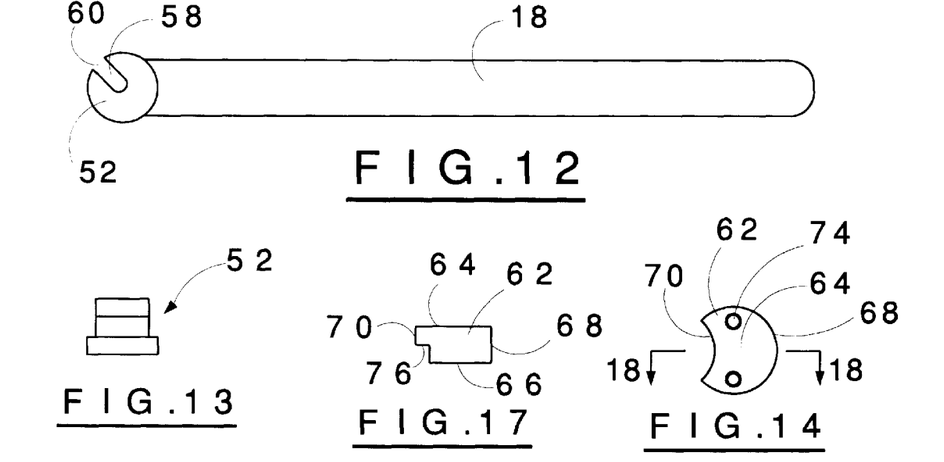
FIG. 12 is a bottom view of the portion shown in FIG. 10.
FIG. 13 is an end view viewed from the right side of the portion shown in FIG. 11.
FIG. 14 is an obverse view of retainer means comprising part of the first embodiment of the cable and wire cutters of the invention.
FIG. 17 is a lateral view of the retainer means viewed from the bottom of FIG. 14.
Figure 15:
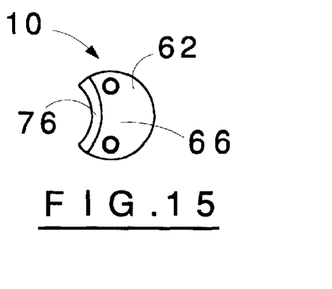
FIG. 15 is the reverse view of retainer means of FIG. 14.
Figure 16:
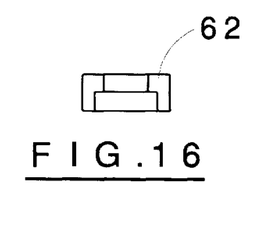
FIG. 16 is a lateral view of the retainer means viewed from the left of FIG. 14.
Figure 18:
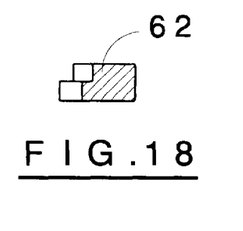
FIG. 18 is a sectional view of the retainer means taken on the line 18—18 of FIG. 14.

Retainer means 10 comprises a contured disc 62 defined by obverse surface 64, reverse surface 66, major vertical arcuate wall 68, minor vertical arcuate wall 70 and bores 74 that mate with bores 72 in planar web 20 (FIG. 3) to receive pins 12 to fasten disc 62 into arcuate end portion 36 of oval chamber 32 (FIG. 1).

Disc 62 comprises a ledge 76 that overlaps base tier 54 of second cutter member 6 when assembled in the first cutter member 4 (FIG. 1) so the second cutter member 6 is rotatably held in the first cutter member 4 between ledge 76 and web inside surface 22 as well as between ledge 38 and web inside surface 22.

Referring to FIGS. 19–26, a second embodiment of a cable and wire cutter 2A of the invention comprises a first cutter member 4A, a second cutter member 6A, retainer means 10A and pins 12 to hold cutter member 6A rotatably positioned in cutter member 4A. Cutter members 4A & 6A are structured like cutter members 4 & 6 as explained above.

Figure 19:
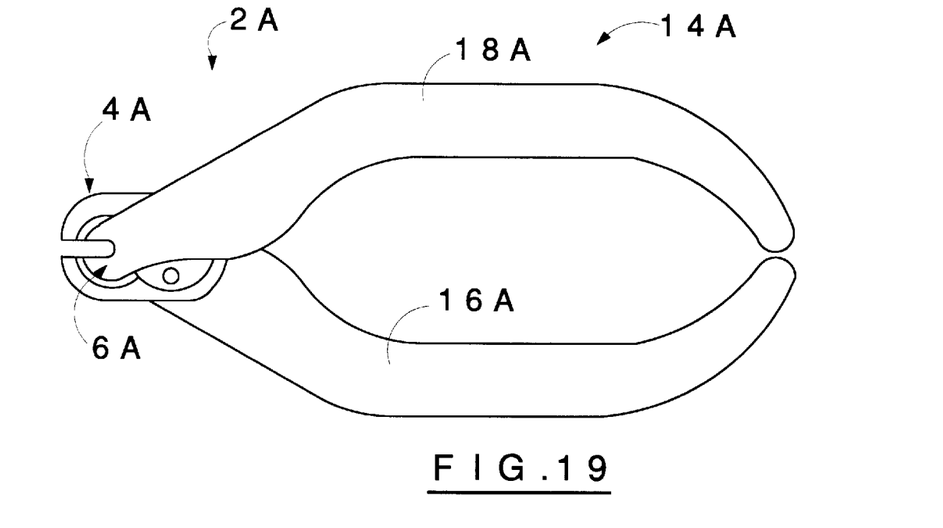
FIG. 19 is a plan view of a second embodiment of the cable and wire cutters of the invention showing it ready to receive a wire or cable to be cut.
Figure 20:
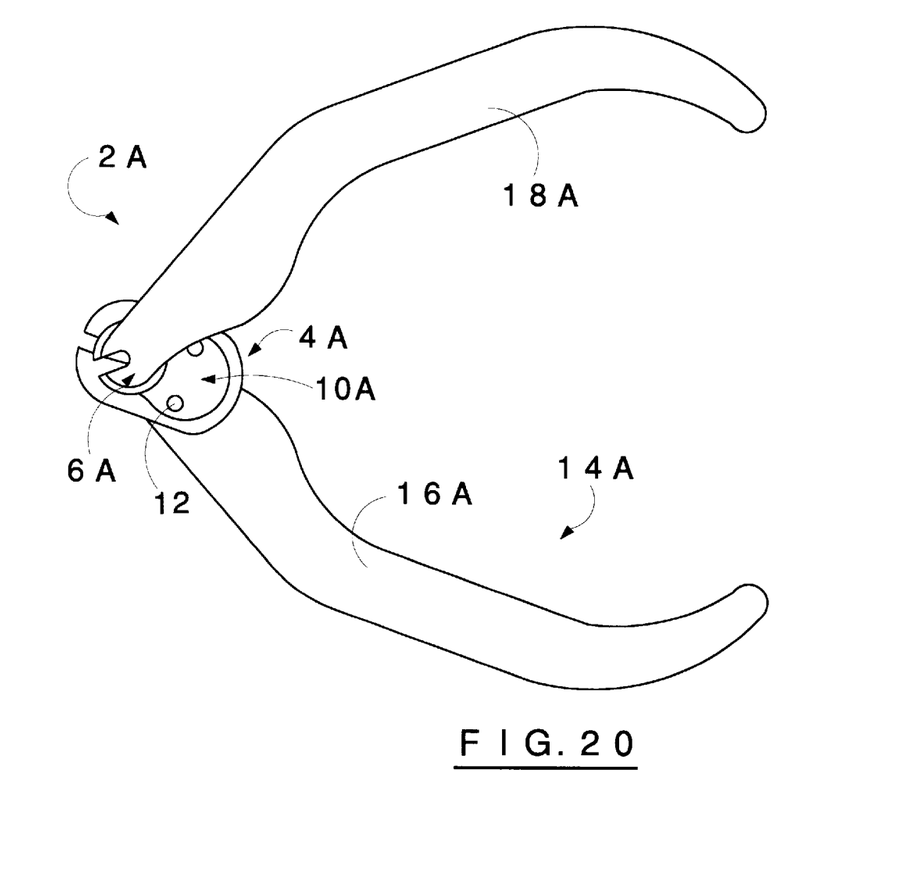
FIG. 20 is a plan view of a second embodiment of the cable and wire cutter shown in a position of partial cutting.
Figures 21, 22:
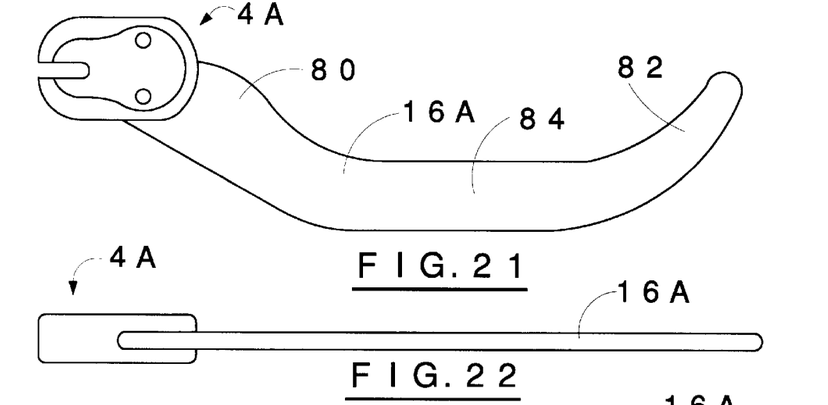
FIG. 21 is plan view of a portion of the second embodiment of the cable and wire cutters of the invention.
FIG. 22 is a lateral view of the portion shown in FIG. 21.
Figure 23:
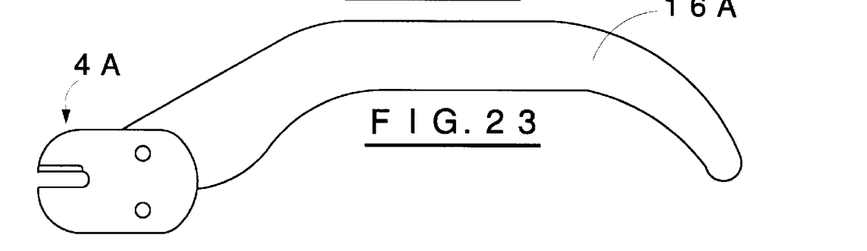
FIG. 23 is a bottom view of the portion shown in FIG. 21.
Figure 24:
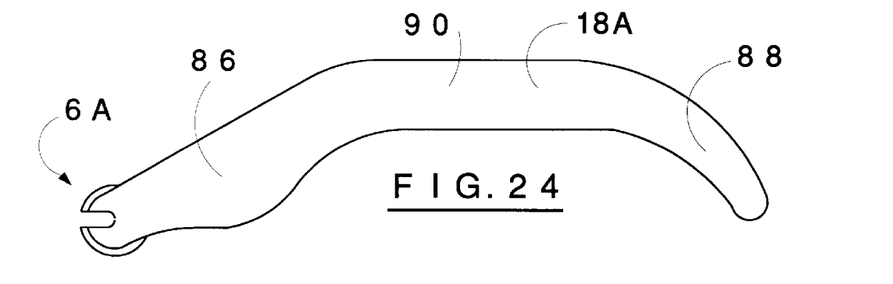
FIG. 24 is plan view of another portion of the second embodiment of the cable and wire cutters of the invention.
Figure 25:
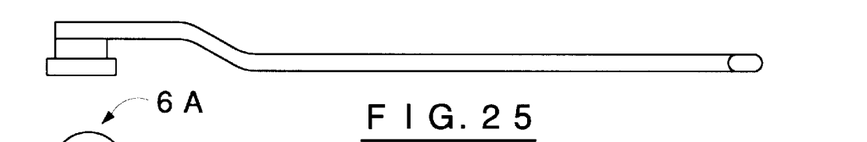
FIG. 25 is a lateral view of the portion shown in FIG. 24.
Figure 26:
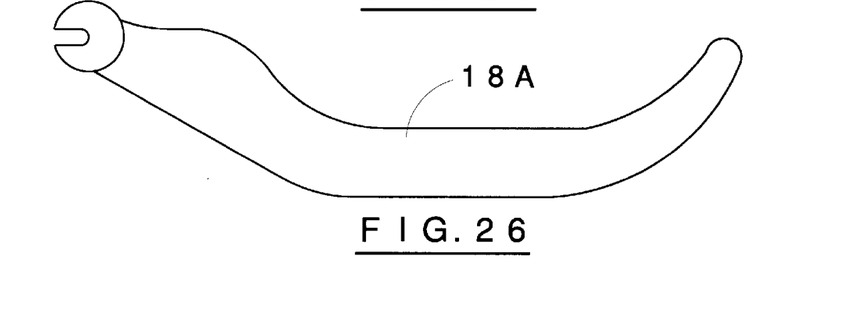
FIG. 26 is a bottom view of the portion shown in FIG. 24.

FIGS. 19 & 20 show that force means 14A, which serves to rotate the cutter member 4A relative to the cutter member 6A, is a first handle 16A that extends integrally from the cutter member 4A and a second handle 18A that extends integrally from the cutter member 6A. When the handles 16A and 18A are moved away from each other as shown by comparing FIG. 19 with FIG. 20, the cutter members 4A & 6A rotate relative to each other about a common pivot axis. Hence, in the first embodiment 2, the handles 16 & 18 are pushed together to cut wire or cable, while in the second embodiment 2A, the handles 16A and 18A are pulled apart to cut wire or cable.

First handle 16A is U-shaped defined by a first arcuate inner end 80 attached to the first cutter member 4A, a first arcuate outer end 82 and an elongated midsection 84 integrally joining the first acurate inner end 80 to the first arcuate outer end 82. Also, second handle 18A is U-shaped and defined by a second arcuate inner end 86 attached to the second cutter member 6A, a second arcuate outer end 88 and an elongated midsection 90 integrally joining the second arcuate inner end 86 to the second arcuate outer end 88.

Figures 27, 28, 29:
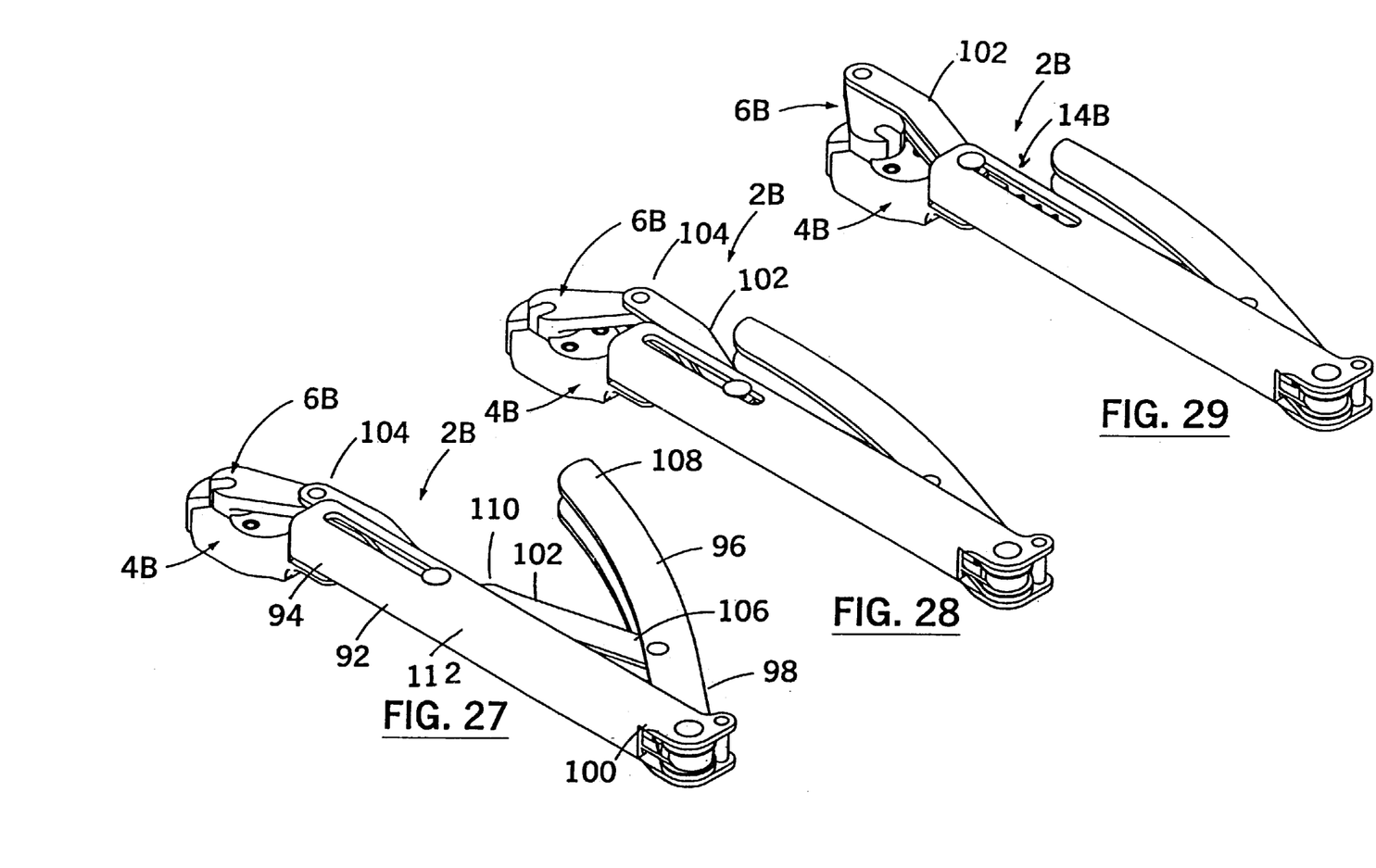
FIG. 27 is a perspective view of an embodiment of a cable and wire cutter of the invention that comprises force multiplier means with its lever arm in opened position and its first and second cutter members in position to receive a wire or cable for cutting.
FIG. 28 is a perspective view similar to FIG. 27, but with its multiplier means arranged at a different force setting.
FIG. 29 is a perspective view of the cutter of FIG. 27 with its multiplier means arranged at a different force setting and with the lever arm moved into the position where the first and second cutter members have performed the cutting of a wire or cable.
Figure 30:
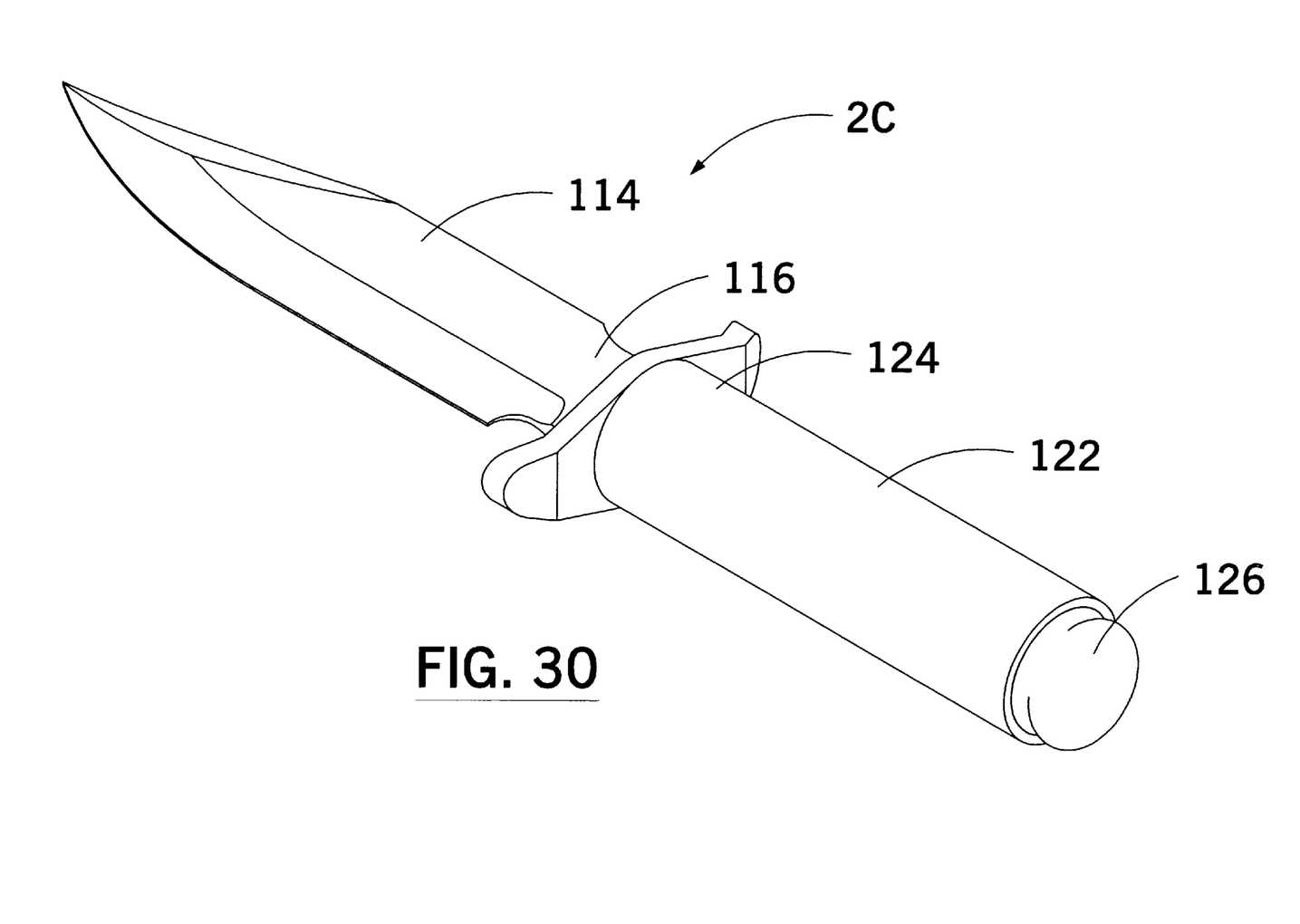
FIG. 30 is a perspective view of a cable and wire cutter of the invention configured as a multifunctional military combat weapon.
Figure 31:
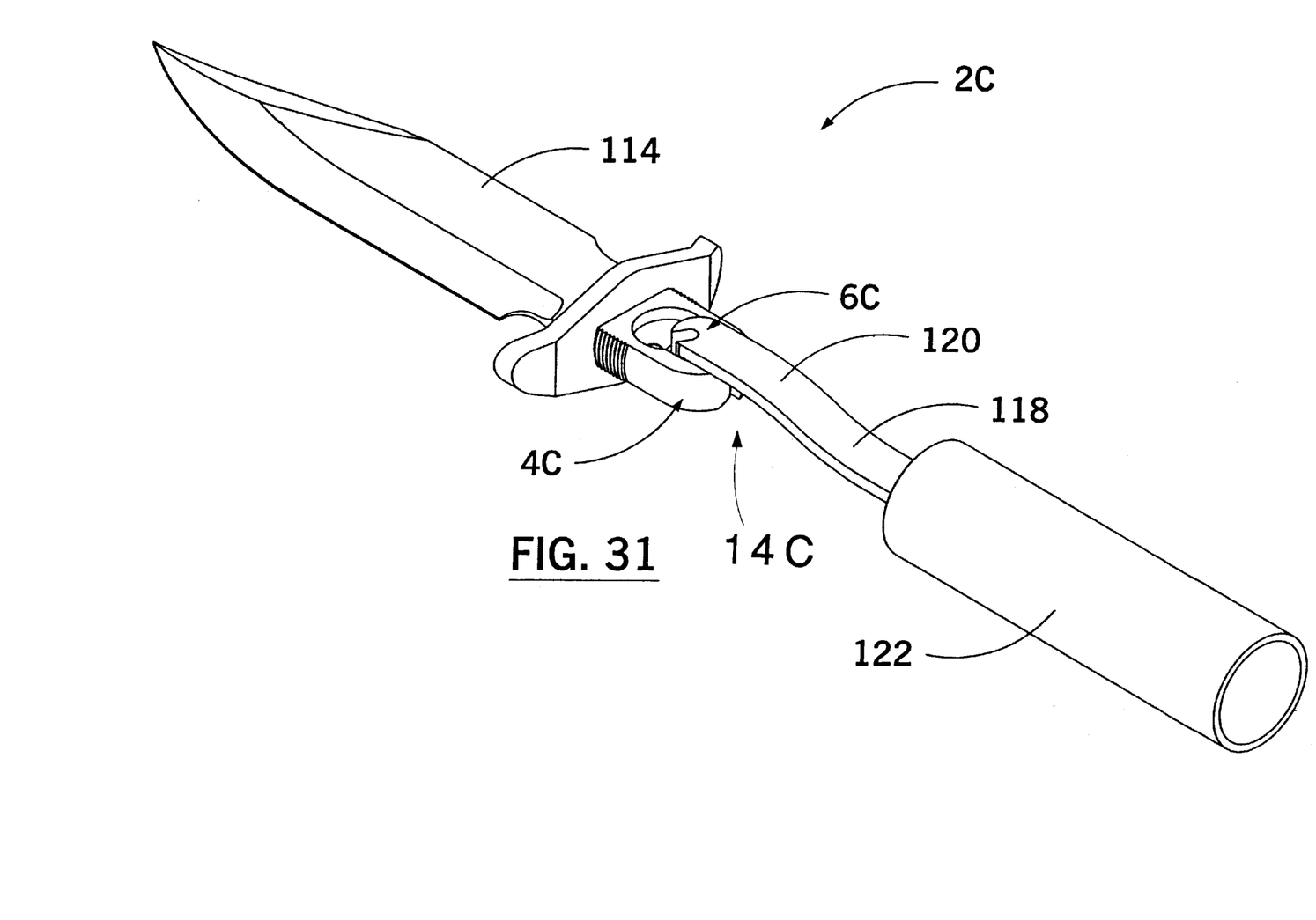
FIG. 31 is a perspective view of the cable and wire cutter of FIG. 30 with the handle portion of the combat weapon of FIG. 30 extended to convert the weapon into its wire and cable cutting mode.
Figure 32:
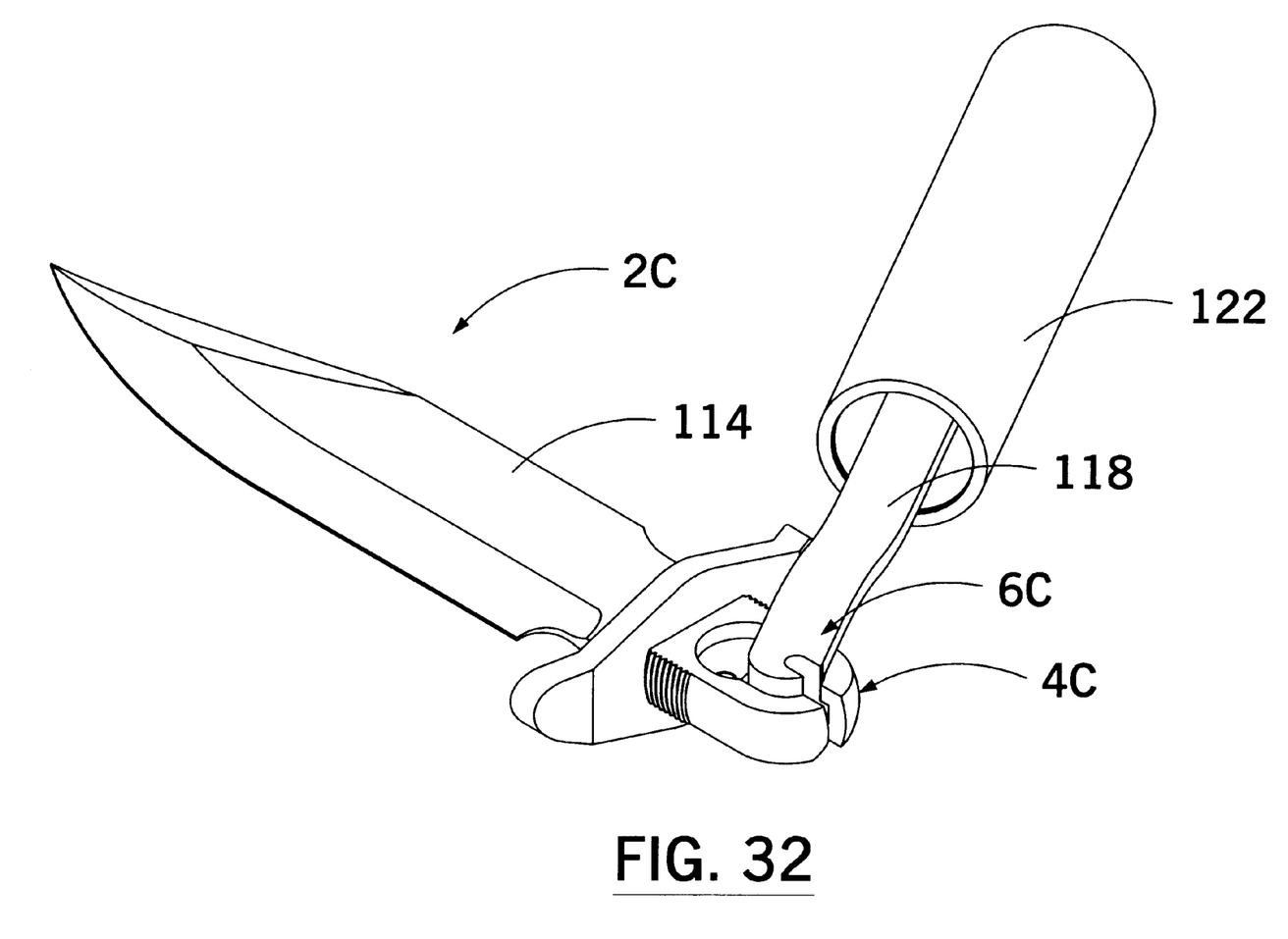
FIG. 32 is a perspective view of the cable and wire cutter of FIG. 31 with the extended handle moved into position so a wire or cable can be inserted into the cutter members for cutting.
Figure 33:
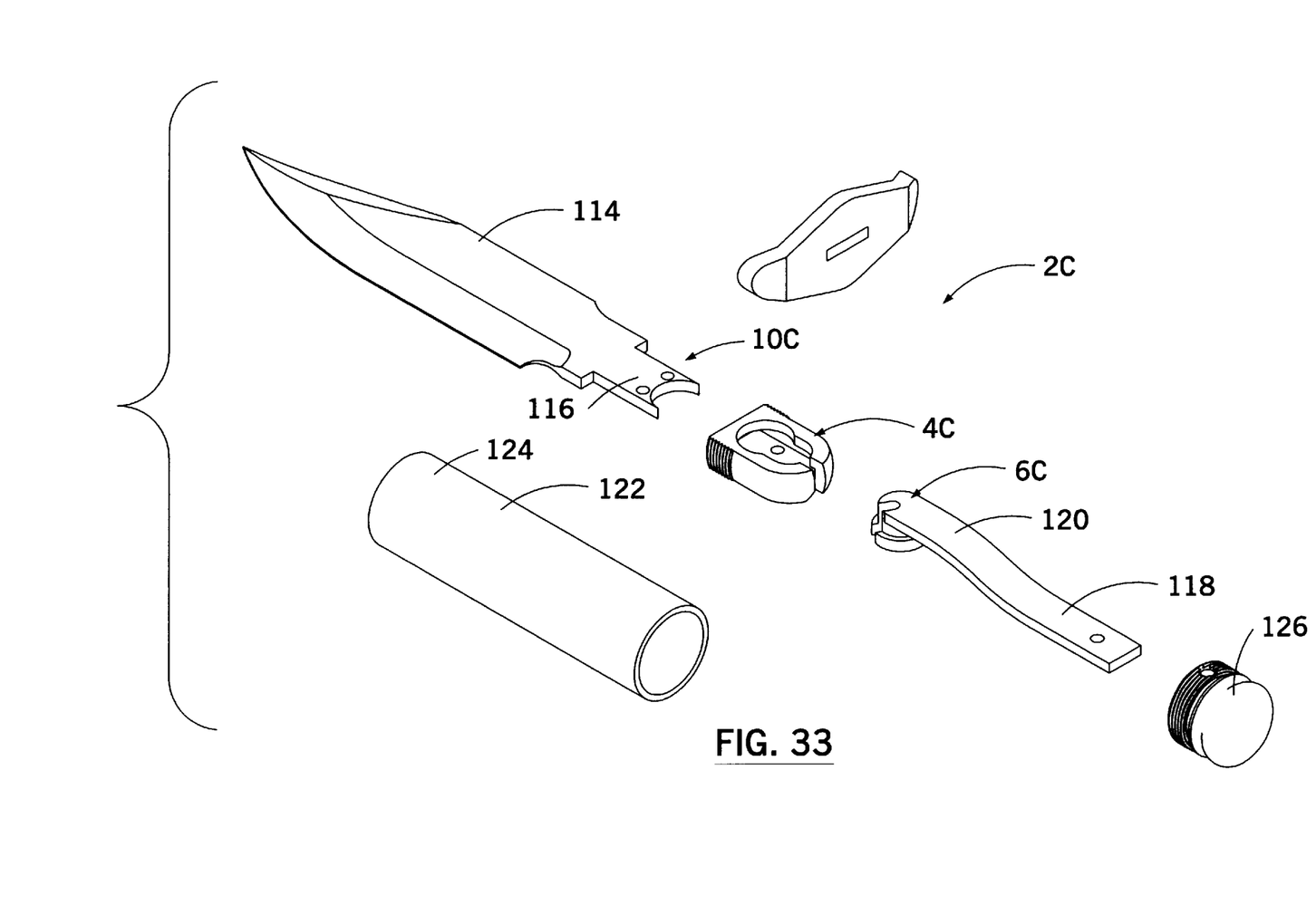
FIG. 33 is an exploded view of the cable and wire cutter of FIG. 30.

FIGS. 27–29 show a third embodiment 2B of the new cutters wherein the force means 14B comprises an extension arm 92 fixed at its inner end 94 to the first cutter member 4B with a lever arm 96 pivoted at its inner end 98 to the outer end 100 of the extension arm 92. The force means 14B further comprises a crank arm 102 (a) pivoted at its inside end 104 to the second cutter member 6B, (b) pivoted at its outside end 106 to the lever arm 96 between its inner end 98 and outer end 108 and (c) pivoted along its central portion 110 at an adjustable position along the central portion 110 of the extension arm 92. The central adjustable positioning of the crank arm 102 relative to the extension arm 92 enables the force applied to the second cutter member 6B in movement relative to the first cutter member 4B by the crank arm 102 to be varied.

FIGS. 30–33 show a fourth embodiment 2C of the new cutters wherein the force means 14C comprises a knife blade 114 fixed at its inner end 116 to the first cutter member 4C and lever arm 118 fixed at its inner end 120 to the second cutter member 6C. The inner end 116 is structured to function as the retainer means 10C to hold first cutter member 4C and second cutter member 6C functionally together.

The handle 122 for the knife blade 114 is slidable along the lever arm 118 between (1) a closed position (FIG. 30) where its inner end 124 encloses the first and second cutter members and operatively engages the knife blade 114 and (2) an opened position (FIG. 31) where it functions as an extension of the lever arm 118 for movement of the second cutter member 6C relative to the first cutter member 4C for the cutting of cables or wires. The handle 122 is held on the lever arm 118 by a cap 126.

What is claimed is:

1. A cable and wire cutter comprising:
   a first cutter member and a second cutter member,
   force means to rotate said first cutter member relative to said second cutter member about a pivot axis to cut a work piece,
   said first cutter member comprising a planar web defined by a web inside surface and a web outside surface,
   a perimeter wall having an outer wall surface and an inner wall surface upstanding from said web inside surface,
   said inner wall surface and said web inside surface defining an oval chamber having a semicylindrical end portion and an opposed arcuate end portion,
   a semicircular ledge that extends laterally from said inner wall surface, defining with said inner wall surface and said web inside surface, a semi-cylindrical cavity of a first radius in said semi-cylindrical end portion, one end of said first radius being located at said pivot axis,
   a first slot extending through both said perimeter wall and said planar web providing an entrance into said oval chamber for said work piece and defining in said planar web a cutting edge and an opposed edge that both extend from said perimeter wall toward said pivot axis,
   said second cutter member comprising a tiered cylinder defined by a base tier having a second radius slightly shorter than said first radius and an integral upper tier of third radius shorter than said second radius, one end of each said second radius and said third radius being located at said pivot axis,
   a second slot extending through both said base tier and said upper tier providing an entrance extending toward said pivot axis into said tiered cylinder for said work piece,
   said base tier of said second cutter member being rotatably positioned in said semicylinderical cavity of said first cutter member permitting said force means to rotate said first slot across said second slot to cut said work piece.

2. The cable and wire cutter of claim 1 wherein said arcuate end portion of said oval chamber includes retention means to retain said base tier of said second cutter member within said semi-cylindrical cavity of said first cutter member.

3. The cable and wire cutter of claim 2 wherein said retention means comprises a contoured disc fixed by fasteners in said arcuate end portion.

4. The cable and wire cutter of claim 1 wherein said force means comprises a first handle extending from said first cutter member and a second handle extending from said second cutter member.

5. The cable and wire cutter of claim 4 wherein said first handle is moved toward said second handle to rotate said first slot across said second slot to cut said work piece.

6. The cable and wire cutter of claim 5 wherein said first handle is essentially straight and defined by a first inner end attached to said first cutter member, a first outer end and an elongated midsection integrally joining said first inner end to said first outer end and said second handle is essentially straight and defined by a second inner end attached to said second cutter member, a second outer end and an elongated midsection integrally joining said second inner end to said second outer end.

7. The cable and wire cutter of claim 4 wherein said first handle is moved away from said second handle to rotate said first slot across said second slot to cut said work piece.

8. The cable and wire cutter of claim 7 wherein said first handle is U-shaped defined by a first arcuate inner end attached to said first cutter member, a first arcuate outer end and an elongated midsection integrally joining said first acurate inner end to said first arcuate outer end and said second handle is U-shaped and defined by a second arcuate inner end attached to said second cutter member, a second arcuate outer end and an elongated midsection integrally joining said second arcuate inner end to said second arcuate outer end.

9. A cable and wire cutter comprising:
   a first cutter member and a second cutter member,
   force means to rotate said first cutter member relative to said second cutter member about a common pivot axis to cut a work piece,
   said first cutter member containing an arcuate cavity defined by a first periphery that is at least partially circular having a first radius, one end of said first radius being at said pivot axis,
   a first slot, sized to receive said work piece, in said first cutter member that extends through said first periphery into said arcuate cavity radially toward said pivot axis,
   said second cutter member comprising a cylindrical part defined by a circular second periphery having a second radius nearly equal to said first radius, one end of said second radius being at said pivot axis, ,
   a second slot, sized to receive said work piece, in said cylindrical part that extends through said second periphery radially toward said pivot axis, and
   means retaining said cylindrical part in said arcuate cavity for rotation about said pivot axis by said force means to pass said first slot across said second slot to cut said work piece.

10. The cable and wire cutter of claim 1 wherein said force means comprises force multiplier means.

11. The cable and wire cutter of claim 10 wherein said multiplier means includes a lever arm pivoted at its inner arm to an outer end of an extension arm, a crank arm pivoted at its inside end to said second cutter member, said crank arm further being pivoted at its outside end to said lever arm between inner and outer ends of said lever arm and pivoted along its central portion at an adjustable position along a central portion of said extension arm, whereby a central adjustable positioning of said crank arm relative to said extension arm enables the force applied to said second cutter member in movement relative to said first cutter member by said crank arm to be varied.

12. The cable and wire cutter of claim 1 in the configuration of a multifunctional military combat weapon wherein said force means comprises a knife blade fixed at its inner end to said first cutter member and a lever arm fixed at its inner arm to said second cutter member.

13. A cable and wire cutter comprising:
   a first cutter member,
   a second cutter member comprising a circular periphery defined by a given radius and a given inside end, said circular periphery being greater than the periphery of cable or wire to be cut by said cutter,
   said first cutter member comprising a partially circular cavity defined by another radius slightly longer than said given radius and another inside end,
   said given inside end being coincident with said another inside end whereby said partially circular cavity of said first cutter member serves as the pivot element for said second cutter member.

* * * * *